United States Patent [19]

Brown

[11] Patent Number: 4,619,163
[45] Date of Patent: Oct. 28, 1986

[54] AUTOMATIC MITERING APPARATUS

[76] Inventor: Irving J. Brown, R.D. 2, Cato, N.Y. 13033

[21] Appl. No.: 629,179

[22] Filed: Jul. 9, 1984

[51] Int. Cl.⁴ ............................................. B23D 45/10
[52] U.S. Cl. ........................................ 83/82; 83/145; 83/216; 83/229; 83/265; 83/268; 83/286; 83/390; 83/487; 83/556; 83/829; 144/245 E
[58] Field of Search .................. 83/27, 103, 82, 215, 83/216, 468, 471.1, 471.2, 471.3, 556, 488, 558, 559, 560, 417, 419, 734, 374, 375, 390, 222, 229, 265, 268, 286, 563, 495, 498, 499, 647 A, 487, 829, 210, 211, 555, 581, 540; 144/245 R, 145, 245 C, 245 E, 118, 119 R, 119 H

[56] References Cited

U.S. PATENT DOCUMENTS

| | | | |
|---|---|---|---|
| 1,700,683 | 1/1929 | Madsen | 83/471.3 |
| 3,289,662 | 12/1966 | Garrison | 83/471.3 |
| 3,709,075 | 1/1973 | Goellner | 83/27 |
| 3,752,023 | 8/1973 | Allison et al. | 83/107 |
| 3,838,723 | 10/1974 | Sandberg | 83/417 |
| 3,878,744 | 4/1975 | Luxnat | 83/488 |
| 4,104,944 | 8/1978 | Janssen | 83/488 |
| 4,289,054 | 9/1981 | Pieper et al. | 83/113 |
| 4,449,558 | 5/1984 | Wiegand | 83/471.2 |

Primary Examiner—Frank T. Yost
Assistant Examiner—Hien H. Phan
Attorney, Agent, or Firm—Shlesinger, Fitzsimmons & Shlesinger

[57] ABSTRACT

Precut pieces of wood of like configuration are stacked in a hopper from the lower end of which they are advanced one-by-one by a reciprocable pusher onto a horizontally disposed work station. As soon as a workpiece is positioned on the station it is automatically clamped into place, after which two rotary saws, which are mounted adjacent opposite ends of the station, are reciprocated from retracted to advanced positions, during which movement they cut away portions of the workpiece at opposite ends thereof. As soon as the saws have advanced passed the workpiece, they are retracted slightly away from opposite ends of the workpiece, so that they will not reengage the workpiece when they return to their starting positions. When the saws are retracted the now-cut workpiece is automatically released and then ejected from the work station, after which a cycling relay automatically causes another workpiece to be shifted onto the work station so that the above-noted steps are repeated. The electrical control means for the apparatus causes the cutting cycle to be repeated until the hopper is emptied.

13 Claims, 4 Drawing Figures

AUTOMATIC MITERING APPARATUS

BACKGROUND OF THE INVENTION

This invention relates to apparatus for cutting wood, and more particularly to double end cut-off or mitering apparatus having two saws which miter or cut the opposed edges of wood blocks that are fed one by one to a cutting station in the apparatus.

Although double end cutting or mitering devices are not new, most prior art devices of this variety have not been completely satisfactory. U.S. Pat. No. 4,208,934, for example, discloses a semi-automatic machine which utilizes two rotary saws that are advanced by a foot treadle along merging paths to engage and cut mitered surfaces on opposite sides of a work piece, which must be manually clamped onto and removed from a work station on the machine. The machine disclosed in U.S. Pat. No. 3,854,360 is somewhat more automated, but its two saws are fixed to rotate at right angles to each other, and are vertically movable in unison to cut strips of molding to predetermined lengths, as determined by a pattern piece. Since the positions of the saws are fixed relative to each other the machine is very limited in its use.

The Madsen U.S. Pat. No. 1,700,683 discloses an automated double end universal saw having two rotary blades mounted on adjustable rams for reciprocation along converging paths to cut mitered ends on a piece of wood clamped in a work station on the machine. The work pieces, however, must be inserted manually into a work station; and must be removed manually after being cut. Moreover the rotary saw blades always advance and retract along the same paths. In U.S. Pat. No. 3,878,744 dual rotary saws are also mounted to reciprocate along spaced paths for end cutting purposes, but the saws are disposed to be deflected on their return strokes so as to prevent any cutting of the previously cut workpiece during the retraction of the blades. While this latter feature is desirable, it nevertheless requires the use of special saw blades and fluid jet means for deflecting the blades. Other but perhaps less pertinent rotary saw devices and control means therefore are disclosed in U.S. Pat. Nos. 3,289,662; 2,872,955; 4,131,143; 493,540 and 3,888,152.

None of the above-noted mitering devices, however, discloses an apparatus in which a pair of mitering saws are mounted for substantially automated operation relative to a cutting station into which precut blocks of wood are delivered one by one from a hopper supply thereof. Furthermore, it is neither possible nor desirable in many cases to rely on fluid means for deflecting saw blades from the path of a workpiece following a cutting operation.

It is an object of this invention, therefore, to provide improved automatic mitering apparatus of the type described which is relatively inexpensive to manufacture and operate, and which is designed to prevent any cutting of the work upon retraction of the saws after cutting operation.

Still another object of this invention is to provide improved mitering apparatus of the type described which is adapted to be employed with a work feeder, which automatically feeds workpieces one by one into a cutting station on the apparatus for simultaneous cutting and trimming by a pair of rotating saw blades.

Other objects of the invention will be apparent herernafter from the specification and from the recital of the appended claims, particularly when read in conjunction with the accompanying drawings.

SUMMARY OF THE INVENTION

Similarly shaped blocks of wood are stacked in a hopper adjacent a work station which is supported substantially centrally above a work bench or table top. Adjustably mounted on the bench beneath the work station are the motors of two rotary saws, which are reciprocable horizontally on needle bearings between retracted and advanced positions. The needle bearings are carried by two horizontally disposed bearing plates carried by circular adjusting plates, that in turn are mounted on two, horizontally disposed bed plates for rotatable adjustment thereon about vertical axes. The two bed plates are connected to a pair of cylinders operable to shift the bed plates slightly laterally toward each other prior to cutting, and away from each other following each cutting operation.

In use, wood blocks are shifted laterally and one by one from the hopper onto the work station, during which operation a resilient guide arm engages each block to urge it against a wall at the back of the station. When the block is properly positioned it is clamped in place, the guide arm is retracted, the bed plates are shifted by their cylinders slightly toward each other, and the rotating saws are advanced to cut the wood block. When the two cuts have been made the bed plate shifting cylinders are operative to permit slight lateral retraction of the bed plates, and hence the saw blades, so that the now-cut block is not engaged by the two saws as the latter are thereafter retracted to their starting positions. When the saws retract the now-trimmed work is released and automatically ejected, after which the cycle repeats itself.

DETAILED DESCRIPTION OF THE PREFERRED EMBODIMENTS

Referring now to the drawings by numerals of reference, and first to FIGS. 1 to 3, 10 denotes generally a rectangularly shaped bench having a plane, upper surface 11. Secured to surface 11 adjacent the corners of the bench are four pillow blocks 12, each of which supports one end of a pair of spaced, parallel, horizontally disposed support rods 13 and 14. Mounted above the rods 13 and 14 to extend transversely therebetween are two, spaced, parallel, horizontally disposed bed plates 16 and 17, opposite ends of which are secured to the upper ends of four sets of conventional sleeve bearings 18, which are mounted for sliding adjustment on rods 13 and 14, thereby to permit adjustment of plates 16 and 17 toward and away from each other.

Mounted in conventional manner on the upper surfaces of the bed plates 16 and 17 for rotatable adjustment about vertical axes are two, circular, carriage adjusting plates 21 and 22, respectively. As shown more clearly in FIG. 3, plates 21 and 22 are positioned on plates 16 and 17 approximately above the forward supporting rod 13, so that they will be located adjacent the front or left-hand side of the apparatus as viewed in FIG. 3. Also as noted in FIGS. 2 and 3, each of the adjusting plates 21 and 22 has inscribed on its outer peripheral surface a series of graduations the purpose of which will be apparent from the hereinafter description.

Secured at their undersides to the upper surfaces of the adjusting plates 21 and 22, and projecting horizontally and in cantilever fashion rearwardly of these plates toward the rear supporting rod 14 are two, spaced, parallel, horizontally disposed bearing supporting plates 23 and 24. Each of the plates 23 and 24 carries on its upper surface a pair of spaced, parallel, longitudinally extending needle bearings 25 and 26, respectively. Slidably supported at their undersides on each of the two sets of needle bearings 25 and 26 are two, rectangular, horizontally disposed motor carriage plates 27 and 28, respectively. Secured to the upper surfaces of plates 27 and 28 are electric motors 29 and 30, respectively, the operating shafts of which have fastened thereon the circular saws S1 and S2, respectively.

Each of the carriage plates 27 and 28 has on its underside a clamp 32, which overlies one of two, elongate cable cylinders 33 and 34, which are fastened on the bearing plates 23 and 24, respectively, to extend longitudinally thereof between the associated needle bearings 25 and 26. Each of the cable cylinders 33 and 34 has an upper cable run 35, which is fastened to the clamp 32 on the underside of the associated carriage plate 27 or 28, whereby the cylinder cables 35 can be utilized to reciprocate the carriage plates 27 and 28, and hence saw blades S1 and S2, longitudinally of the needle bearings 25 and 26 for purposes noted in greater detail hereinafter.

Each of two straps 41, which are adjustably fastened at opposite ends thereof by clamps 42 to the rods 13 and 14, extends transversely between these rods beneath one of the bed plates 16 and 17, respectively. Each strap 41 carries intermediate its ends one of two cylinders 43 and 44 the operating pistons of which are fastened to lugs 45 and 46 that project from the undersides of the bed plates 16 and 17, respectively. Consequently, upon the operation of the cylinders 43 and 44 as noted hereinafter, the bed plates 16 and 17 will be shifted slightly relative to one another on the support rods 13 and 14. Also, of course, by adjusting the distance between the straps 41 the normal spacing separating the blades S1 and S2 can be varied.

Secured to and projecting above the rear of the bench 10 are two, spaced, vertically extending posts 51, each of which has a horizontal section 52 overlying the bench 10 adjacent opposite sides thereof. Mounted on the forward ends of the sections 52 of the posts 51 are two, vertically spaced, horizontally disposed needle bearings 53, the axes of which lie in the vertical plane extending approximately through the center of the bench 10. Mounted for lateral adjustment on the needle bearings 53 is the vertically disposed, bifurcated leg 55 of a generally L-shaped work supporting bracket, which has its other leg 56 projecting forwardly and at right angles from the lower edge of the bracket leg 55. Mounted on the face of the vertical bracket leg 55 in laterally spaced, parallel relation to each other are two, vertically disposed clamping cylinders 57, the plungers of which project out of the lower ends of the cylinders and have thereon work clamping heads 58, which overlie the upper, work supporting surface of the horizontal bracket plate 56. Mounted on another pair of brackets 61 (FIG. 3) which project on the back of the vertical bracket leg 55 are two, horizontally disposed ejection cylinders 62 (FIGS. 1 and 3), the plungers of which also project exteriorly of the cylinders and have thereon operating heads 63 (FIG. 3), which project into the registering openings 64 formed in the vertical bracket leg 55 for purposes noted hereinafter.

Figure 2:
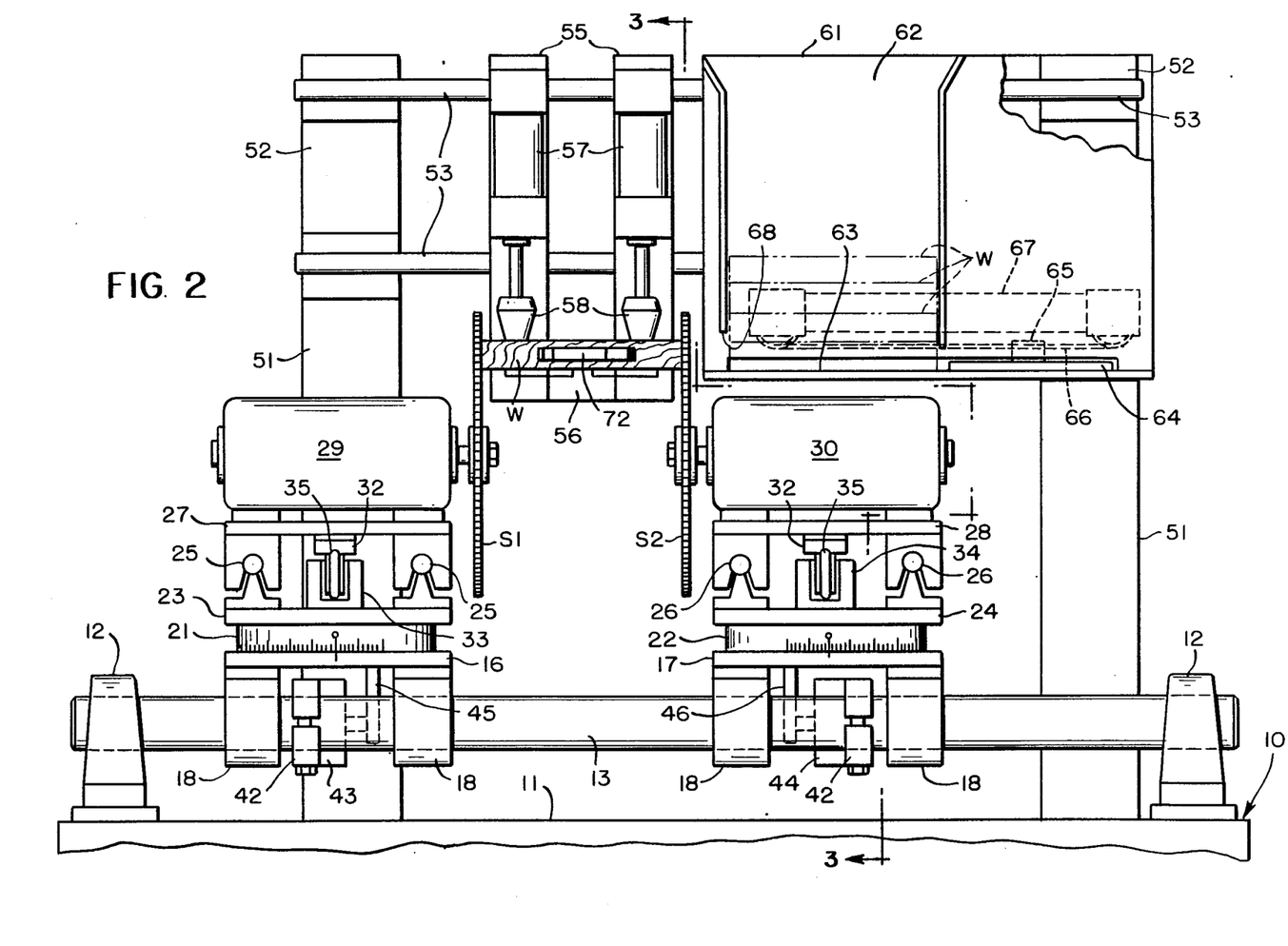
FIG. 2 is a fragmentary front elevational view of this apparatus with portions thereof cut away for purposes of illustration.

Also mounted at the rear thereof on the needle bearings 53 is a hopper or work feeder 61 having therein a chamber 62 in which rectangularly shaped blocks of wood W are adapted to be stacked one upon the other as shown in phantom by broken lines in FIG. 2. The hopper 61 has a plane, bottom surface 63, which is positioned adjacent to and in coplanar relation with the upper, work supporting surface of the bracket leg 56. Mounted in the hopper 61 adjacent the side thereof remote from the bracket leg 56 is a flat pusher or feeder plate 64, which is disposed to register with the lowermost block of wood or workpiece W contained in the feed chamber 62 of the hopper. Plate 64 is connected by a clamp 65 to the cable 66 of another cable cylinder 67 which is mounted at the back of feeder 61. Cylinder 67 is operated periodically to reciprocate plate 64 in a horizontal plane to cause the plate to engage and push the lowermost piece of work in the hopper 61 laterally outwardly through an opening 68 in the hopper side wall, and onto the upper surface of the horizontal bracket leg 56 in a manner which will be described in greater detail hereinafer.

Figure 1:
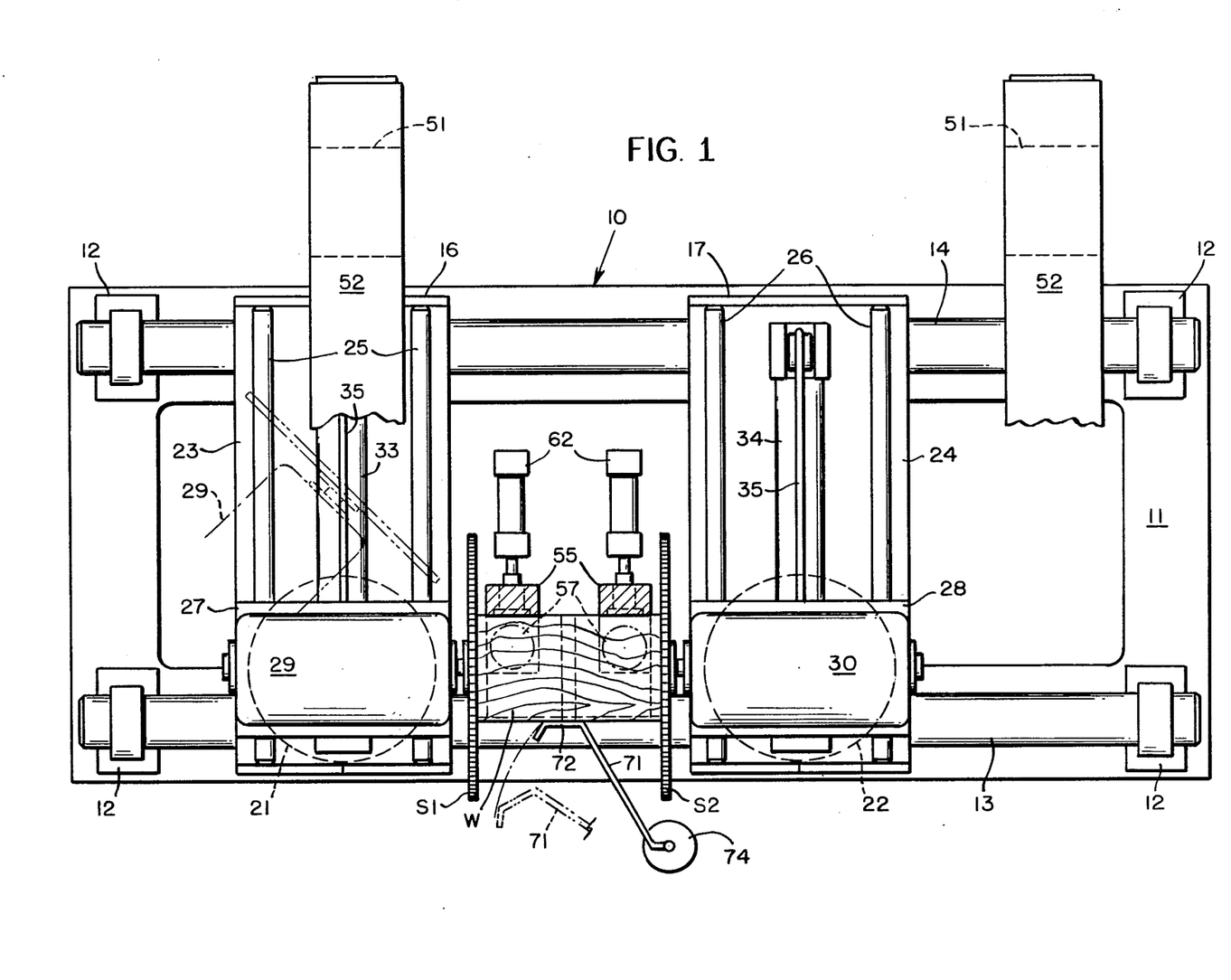
FIG. 1 is a fragmentary plan view of automatic mitering apparatus made according to one embodiment of this invention, portions of the apparatus being cut away and shown in section for purposes of illustration.

In use, and assuming at the outset that the carriage plates 27 and 28 have been shifted by the cylinders 33 and 34 into retracted positions at the rear of the table 10, (see the right hand or broken line position of motor 30 in FIG. 3), and assuming also that the plungers of the cylinders 43 and 44 are in their advanced positions and that the cylinders 57 and 62 have moved their plungers to their retracted positions, the hopper 61 first is filled with a plurality of rectangularly shaped workpieces W, such as similarly shaped blocks of wood which are to be cut. At the start of the operation a resilient tension member 71, which is mounted adjacent the front of the table 10, is swung from an inoperative position, as shown for example by broken lines in FIG. 1, to an operative or full line position in which a flat, work-engaging section 72 on its free end is positioned in predetermined, spaced, confronting relation to the vertical bracket leg 57, and immediately adjacent the forward edge of the work station as defined by the upper surface of the horizontal bracket leg 56. The pusher member 64 in the hopper 61 is then operated by cylinder 67 to move toward the left in FIG. 2, thereby to push the lowermost block of wood W in the hopper 61 laterally outwardly through the opening 68, and onto the upper surface of the bracket leg 56. During this movement the end 72 of the resilient tension member 71 engages the outer edge of the workpiece W to urge it against the forward face the bracket leg 57. As soon as the pusher member 64 has reached its advanced or left-most position as seen in FIG. 2, the mechanism which operates the cylinders 57 is actuated, thereby causing the plunger heads 58 to drop downwardly into frictional engagement with the workpiece W to secure it against movement on the work surface of the bracket leg 56. Also at this time the device which operates the tension mechanism 71, for example a rotary solenoid 74 (FIG. 1) or the like, is deactivated or deenergized so that the tension member 71 is swung back to its inoperative or broken line position (FIG. 1).

Figure 3:
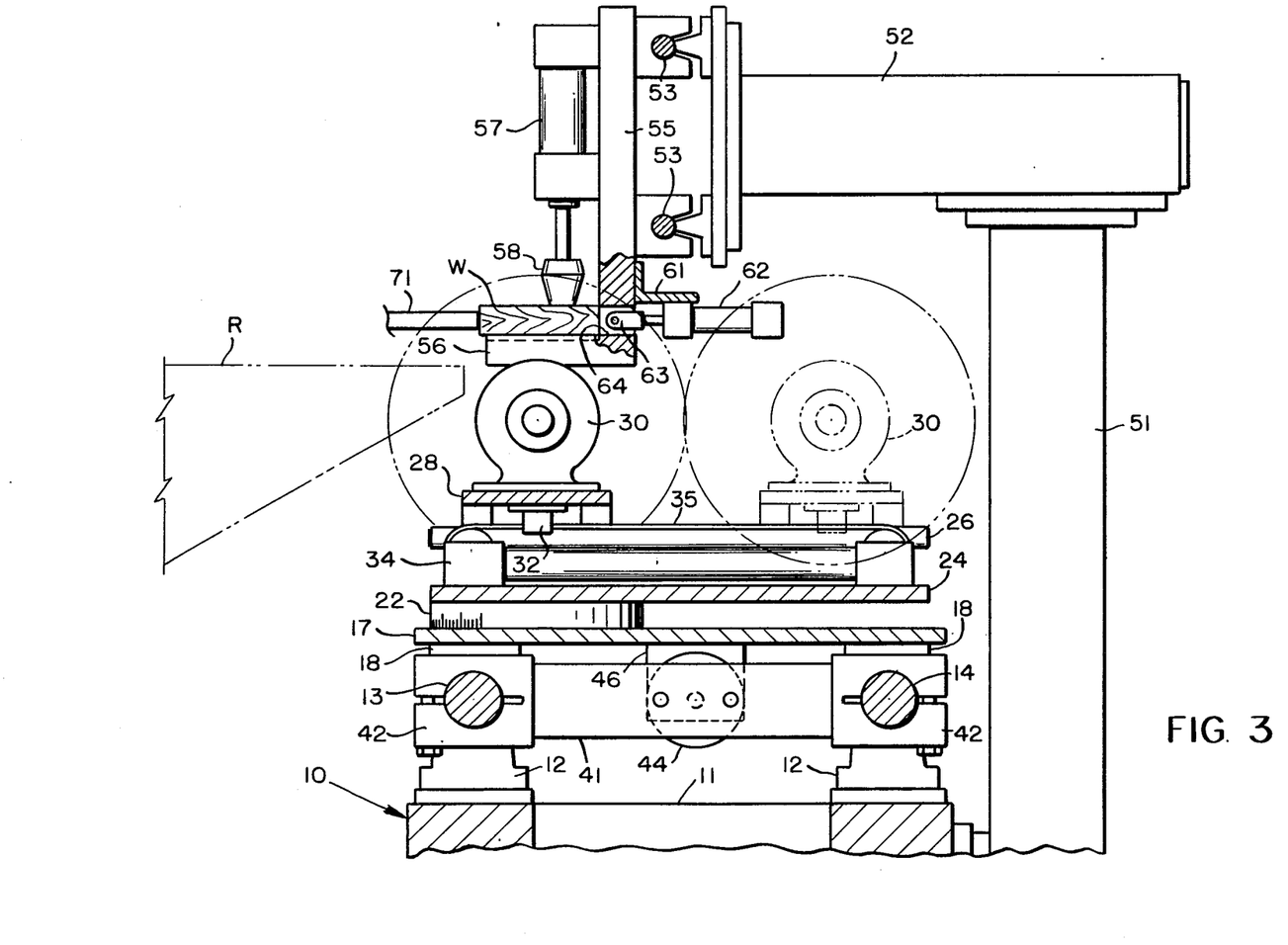
FIG. 3 is a fragmentary sectional view of this apparatus taken generally along the line 3—3 in FIG. 2 looking in the direction of the arrows.

When the holding cylinders 57 have been energized the bed plate cylinders 43 and 44 are actuated to shift plates 16 and 17, and hence saw blades S1 and S2 slightly toward each other. The carriage actuating cylinders 33 and 34 are then activated to cause the cables 35 to advance the carriage plates 27 and 28, and hence the rotating saws S1 and S2 forwardly toward the front of the table 10, or from the broken line position of the motor 30 as shown in FIG. 3 to the advanced or left hand position as shown in full in FIG. 3. During this advance the rotating saw blades engage and cut or trim the opposed end edges of the now-clamped work W, so that the overall length of the work will equal the distance separating the blades S1 and S2 as shown for example in FIGS. 1 and 2.

When the carriage cylinders 33 and 34 have advanced the saw blades to their foremost positions (FIG. 1), at which time the trimming of the workpiece W will have been completed, the special carriage shifting or positioning cylinders 43 and 44 are deactivated to cause their associated plungers to be retracted slightly, which in turn causes the bed plates 16 and 17, and hence the motors 29 and 30 and the attached saws to be shifted slightly away from each other, and from the confronting edges of the now-trimmed workpiece W. After this slight lateral movement of the saw blades has occurred, the carriage cylinders 33 and 34 are once again actuated to cause their associated cables 35 to draw or retract the carriage plates 27 and 28 rearwardly of the table 10 to their starting or retracted positions. During this retraction the blades S1 and S2, of course, will not be in contact with the opposed side edges of the trimmed workpiece W, and as a consequence will not cause any undesirable scoring or unwanted trimming of the workpiece.

As soon as the carriage plates 27 and 28 have reached their fully retracted positions the holding cylinders 57 are actuated to retract their associated plunger heads 58, thereby releasing the now-trimmed workpiece W; and at the same time the ejection cylinders 62 are actuated so that their plunger heads 63 project through the registering openings in the bracket leg 55 to engage and push the trimmed work W off of the cutting station of the bracket leg 56, and, if desired, into a receptacle R (shown in phantom by broken lines in FIG. 3), which may be positioned adjacent the front of the table 10. Thereafter the pusher heads 63 are retracted; and the apparatus is once again prepared to receive a second workpiece from the hopper 61.

Figure 4:
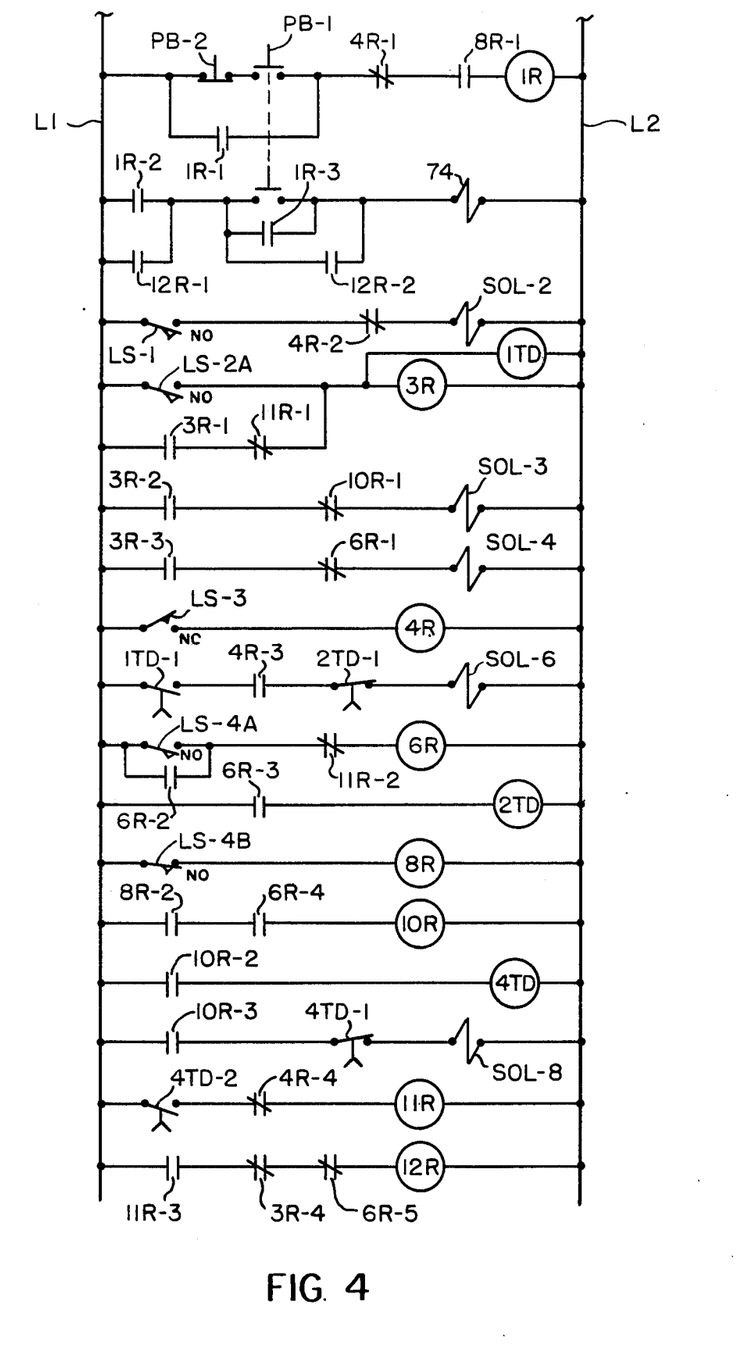
FIG. 4 is a schematic diagram showing one manner in which the operating cylinders of the apparatus can be controlled for automatic operation of the apparatus.

One manner in which the apparatus can be wired for operation is illustrated diagramatically in FIG. 4, wherein L1 and L2 denote opposite sides of a conventional AC power supply, for example a 115 volt power source. When such a voltage exists across lines L1 and L2, and the parts are in their inactive positions as shown in the drawings, a relay 8R is energized through a normally open limit switch LS4B, which is now held closed by the retracted saw carriages 27, 28. This closes a set of normally-open switch contacts 8R-1, which are connected in series between L1 and L2 with an automatic start relay 1R, a set of normally closed relay contacts 4R-1, one of two contacts of a normally-open pushbutton PB-1, and a normally-closed pushbutton PB-2. Therefore, when pushbutton PB-1 is closed, it energizes the relay 1R, which closes a set of holding contacts 1R-1 that are in parallel with the above-noted pushbutton contacts, thereby to keep relay 1R energized after the release of the pushbutton PB-1. Simultaneously with the energization of relay 1R, a second contact on the pushbutton PB-1 closes a circuit which connects the tension arm solenoid 74 and a second set of now-closed relay contacts 1R-2 between lines L1, L2, thereby to actuate the tension arm 71, which is therefore swung into its active or full-line position as shown in FIG. 1.

When tension arm 71 is extended to its operative position, it closes a normally-open limit switch LS-1 which is connected in series between lines L1, L2 with a set of normally-closed relay contacts 4R-2 and a solenoid SOL-2, which controls the feed cylinder 67. As soon as this latter solenoid is energized the feed cylinder 67 operates to advance the feed plate 64, thereby to urge a block of wood W from the bottom of hopper 61, into an operative position on the upper surface of the bracket leg 56, where it is held (see FIG. 1) resiliently against the bifurcated leg 55 by the tension arm 71.

When the clamp 65 on the feed cylinder reaches its extended position it closes a normally-open limit switch LS-2A, which is connected between lines L1, L2 in series with a relay 3R and a saw advance timer 1TD, which is in parallel with relay 3R. The now-energized relay 3R closes a set of holding contacts 3R-1 which are in series with another set of normally-closed relay contacts 11R-1 across the limit switch LS2-A, thereby to retain relay 3R and the timer 1TD energized upon subsequent reopening of the limit switch LS-2A, at least until such time as the contacts 11R-1 are opened as noted hereinafter. Relay 3R also closes at this time two additional sets of contacts 3R-2 and 3R-3, which are connected, respectively, between L1, L2 with a set of normally closed relay contacts 10R-1 and a solenoid SOL-3, and another set of normally-closed contact 6R-1 and a solenoid SOL-4. The now-energized SOL-3 actuates the clamping cylinders 57 to advance their heads 58 downwardly into clamping engagement with the work W; while SOL-4 actuates the shift cylinders 43 and 44 to shift the bed plates 16 and 17 slightly laterally, so that the saws will be in proper cutting positions, when advanced.

As soon as the clamping cylinders are actuated, their clamping heads 58 permit a normally-closed limit switch LS-3 to close and energize between L1 and L2 a relay 4R. This opens the relay contacts 4R-1 to deenergize relay 1R, thereby opening contacts 1R-1, 1R-2 and 1R-3, so that the solenoid 74 becomes deenergized and returns the tension arm 71 to its retracted (broken line) position as shown in FIG. 1. Also at this time contacts 4R-2 open to deenergize SOL-2, so that the feed cylinder is retracted to its starting position, thus permitting LS-2A to open, but relay 3R and timer 1TD remain energized through the holding switch 3R-1.

At this moment the time delayed closing switch 1TD-1 closes to complete a circuit between lines L1, L2 with now-closed switch contacts 4R-3, now-closed time delayed opening switch 2TD-1 and a solenoid SOL-6, which now actuates the saw advancing cylinders 33 and 34. This advances the saw carriages 27, 28 and hence the rotating saws S1 and S2 from the right to the left hand positions as shown in FIG. 3, thereby effectively cutting opposite ends of the work W then clamped on the bracket leg 56. When the saw carriages reach their advanced positions they close a normally-open limit switch LS-4A, which is connected in series between L1 and L2 with normally-closed switch contacts 11-R2 and a relay 6R, which now becomes energized. Relay 6R opens its contacts 6R-1, thereby deenergizing SOL-4 so that the saw shifting cylinders 43 and 44 are actuated to retract the saw carriages laterally and slightly away from each other, thereby shifting the saws S1 and S2 slightly away from each other so that they will not contact the work W, when the saws are thereafter retracted back to their starting positions.

At this time relay 6R also closes a holding switch 6R-2, which is connnected in parallel with limit switch LS-4A; and it also closes another set of contacts 6R-3, which are in series between L1 and L2 with another timer 2TD. This opens the switch 2TD-1 to deenergize SOL-6, thereby deactivating the saw advancing cylinders 33 and 34 so that the saw carriages are returned to their retracted or starting positions. During this interval the switch contacts 6R-2 keep the relay 6R energized.

When the saw carriages have been fully retracted they close the limit switch LS-4B once again to energize the relay 8R, thereby closing its contacts 8R-1, which are in series with relay 1R. Closed also at this time is a second set of contacts 8R-2, which are in series with a now-closed set of relay contacts 6R-4 and a relay 10R between lines L1, L2. This energizes the relay R10 which opens its contacts 10R-1 to deenergize SOL-3 so that the clamping cylinders 57 are returned to their starting positions, thereby retracting their heads 58 upwardly to disengage the work W. When the clamping heads are in their retracted positions they open the limit switch LS-3, thereby deenergizing the relay 4R and returning its contacts to their normal positions. Relay 10 also closes a second set of contacts 10R-2, which are connected in series between lines L1, L2 with a timer 4TD, and a third set of contacts 10R-3, which are connected between L1, L2 with a normally-closed, time delayed opening switch 4TD-1 and a solenoid SOL-8 which, when energized, actuates the ejector cylinders 62. Cylinders 62 thus advance their ejection heads 63, which eject the now-trimmed workpiece W off of the front of the bracket leg 56 and into the receptacle R.

Thereafter the timer 4TD times out, and opens its switch 4TD-1 thereby deenergizing SOL-8, so that the ejector heads 63 are retracted back to their starting position. Also closed now is a time delayed closing switch 4TD-2, which is in series with a set of normally closed relay contacts 4TD-1 and a relay 11R between L1 and L2, thereby energizing the relay 11R, which therefore open its contacts 11R-1 to deenergize the relay 3R and the timer 1TD. Relay 11R also opens a second set of contacts 11R-2 to deenergize the relay 6R and consequently timer 2TD, relay 10R and timer 4TD. A third set of relay contacts 11R-3 also closes at this time to energize a relay 12R between lines L1, L2 through normally closed contacts 3R-4 and 6R-5. This restarts the cycle by closing switch contacts 12R-1 and 12R-2, which are connected in series with the tension arm extending solenoid SOL-74, which once again operates to commence a repeat of the above-described cycle.

From the foregoing it will be apparent that the present invention provides a novel and extremely efficient mitering apparatus, which is capable of quickly and accurately mitering a large number of working pieces in short order, and with little or no supervision once the equipment has been properly set up. The saw carriages are carefully controlled to prevent any undesirable scoring or recutting of the workpieces following the initial cutting or mitering operation, and specifically during the retraction of the cutting saws from operative to inoperative positions. Furthermore, the work is fixed or clamped in a predetermined position during the cutting operation so that it will be accurately cut, thereby minimizing if not eliminating improperly cut pieces of work. It will be noticed also that it is not necessary for an operator to hold or manipulate the work during a cycle, thus obviating any undesirable injury which might otherwise occur if manual operations were required.

It will be readily apparent also that the relative positions of the two cutting saws can be adjusted laterally on rods 13 and 14 to accommodate wood pieces of different sizes. Also it is possible to effect different types of cuts in the work by adjusting the plates 21 and 22 into different angular positions about their repsective vertical axes. (See e.g. the broken line position of motor 29 in FIG. 1.) Moreover, while this invention has been illustrated and described in detail in connection with only one embodiment thereof, it will be readily apparent that it is capable of still further modification, and that this application is intended to cover any such modifications as may fall within the scope of one skilled in the art or the appended claims.

I claim:

1. Automatic mitering apparatus for wood blocks and the like, comprising a frame, means defining a work station on said frame feeding means operable intermittently and automatically to feed workpieces in a first direction and one-by-one onto said station, clamping means responsive to the movement of a workpiece onto said station automatically to clamp such workpiece intermediate its ends against movement on said station, a pair of mitering saws mounted to rotate on said frame in a pair of spaced planes located adjacent opposite sides, respectively, of said work station, means responsive to the clamping of a workpiece on said station for automatically reciprocating of said saws in said planes between retracted and advanced positions along paths disposed to intersect opposite ends, respectively, of said workpiece, thereby to cause the rotating saws during movement to their advanced positions to cut away opposed end portions of said workpiece, means responsive to the movement of said saws to their retracted positions, and operative independently of said feeding means, for automatically and successively releasing and ejecting said workpieces from said station in a direction transversely of said first direction after it has been cut by said saws, cycling means operative in response to the ejection of a workpiece from said station automatically to actuate said feeding means to feed the next successive workpiece to said station to be clamped thereon by said clamping means, and means operative to effect translational shifting movement of said saws slightly towards said opposite sides of said work station before cutting the workpiece thereon, and to effect translational shifting movement of said saws slightly and transversely away from said work station immediately following the cutting said workpiece.

2. Automatic mitering apparatus as defined in claim 1, wherein said feeding means comprises
   a hopper mounted adjacent said station and disposed to hold therein a column of workpieces the lowermost of which registers with a discharge opening that confronts upon said station, and
   a reciprocable pusher mounted on said hopper at the side thereof opposite said discharge opening and disposed to be intermittently advanced by said cycling means into engagement with said lowermost workpiece to push the latter out of said discharge opening and onto said work station.

3. Automatic mitering apparatus as defined in claim 2, including resilient means engagable with a workpiece upon discharge thereof from said hopper, and operative to guide said workpiece into a predetermined position on said work station.

4. Automatic mitering apparatus as defined in claim 3, wherein
   said work station has thereon a horizontal work-supporting surface, and a vertically disposed work locating surface extending transversely of said horizontal surface, and
   said hopper is positioned adjacent one side of said work station with said discharge opening registering with said horizontal surface forwardly of said work locating surface, whereby workpieces advanced by said pusher are urged between said resilient means and said locating surface onto said horizontal support surface.

5. Automatic mitering apparatus as defined in claim 4, wherein said resilient means comprises
   a resilient tension arm mounted on said frame adjacent said work station, and
   means for swinging said arm into and out of an operative position in which it engages and urges a workpiece against said locating surface during movement of the workpiece onto said work station.

6. Automatic mitering apparatus as defined in claim 1, including
   a first pair of saw supporting members mounted on said frame adjacent opposite sides, respectively, of said work station for adjustment toward and away from each other,
   a second pair of saw supporting members mounted on said first pair of members for reciprocation relative thereto, and
   means mounting said saws on said second pair of supporting members for reciprocation therewith along said paths between retracted and advanced positions, respectively, and for rotation relative thereto about a first pair of axes that extend at right angles to said paths.

7. Automatic mitering apparatus as defined in claim 6, including means mounting said second pair of supporting members on said first pair of members for angular adjustment about a second pair of axes that extend normal to said first pair of axes, thereby to adjust the angular dispositions of the planes in which said saws rotate.

8. Automatic mitering apparatus as defined in claim 6, including means for momentarily shifting said first pair of supporting members toward each other prior to movement of said saws to their advanced positions along said path, and for shifting said first pair of members away from each other, when said saws have reached their advanced positions, and prior to movement of the saws back to their retracted positions.

9. Automatic mitering apparatus as defined in 4, including
   a pair of brackets adjustably secured in spaced relation to each other on said frame, and
   adjusting means connecting said first pair of supporting members to said brackets for movement with said brackets upon adjustment thereof on said frame, and operative prior to movement of said saws to their advanced positions to shift said first pair of supporting members slightly toward each other relative to said brackets, and away from each other when said saws reach their advanced positions.

10. Automatic mitering apparatus, comprising
    a frame having thereon a work station,
    a hopper mounted on said frame adjacent said work station and disposed to contain a supply of workpieces,
    means for feeding said workpiece one-by-one in a first direction from said hopper onto said work station,
    means operative in response to the movement of a workpiece onto said station to clamp the last-named workpiece intermediate its ends against movement on the station,
    a pair of rotary saws mounted on said frame to rotate in spaced planes located adjacent opposite sides, respectively, of said work station,
    means operative automatically in response to the clamping of a workpiece on said station to reciprocate said saws in said planes and along adjacent opposite sides, respectively, of said work station between retracted and advanced positions relative to said work station, and along paths that extend normal to the respective axes of rotation of said saws, and transversely of the workpiece clamped on said station,
    means for automatically shifting said saws slightly axially and translationally toward each other and said station prior to movement of the saws to their advanced positions, thereby to cause the saws to engage and cut the workpiece clamped on said work station during the advance of the saws along said paths, and operative to shift said saws axially and translationally away from each other and said work station when the saws reach their advanced positions, thereby to prevent engagement of the saws with said workpiece upon return of the saws to their retracted positions,
    means operative independently of said feeding means for automatically ejecting said workpiece from said work station in a direction transverse to said first direction when said saws return to their retracted positions,
    cycling means operable after ejection of said workpiece from said station automatically to actuate said feeding means to feed another workpiece onto said station, and
    electrical control means for automatically operating said cycling means each time said saws returns to their retracted positions.

11. Automatic mitering apparatus as defined in claim 10, including means mounting said saws on said frame for adjustment about axes normal to the axes of rotation of said saws.

12. Automatic mitering means as defined in claim 10, including guiding means operative during the advance of a workpiece onto said work station resiliently to urge said workpiece in a direction transverse to the direction of movement imparted to the workpiece by said feeding means.

13. Automatic mitering apparatus as defined in claim 10, wherein said work station has thereon a horizontally disposed work supporting surface, said feeding means includes a feeding member reciprocable in a first plane relative to said hopper to urge a workpiece onto said work supporting surface, said clamping means comprises a clamping member reciprocable normal to said supporting surface momentarily to engage and clamp a workpiece thereagainst, and said ejecting means comprises an ejecting member reciprocable normal to said second member to engage and push a workpiece off said work supporting surface upon disengagement thereof by said second member.

* * * * *